US011911783B2

(12) United States Patent

Andersen

(10) Patent No.: US 11,911,783 B2
(45) Date of Patent: Feb. 27, 2024

(54) FLUID SPRAY GUN

(71) Applicant: Scale Up The Fun LLC, Omaha, NE (US)

(72) Inventor: Matthew Andersen, Omaha, NE (US)

(73) Assignee: SCALE UP THE FUN, LLC, Omaha, NE (US)

( * ) Notice: Subject to any disclaimer, the term of this patent is extended or adjusted under 35 U.S.C. 154(b) by 214 days.

(21) Appl. No.: 17/481,026

(22) Filed: Sep. 21, 2021

(65) Prior Publication Data

US 2022/0088629 A1 Mar. 24, 2022

Related U.S. Application Data

(60) Provisional application No. 63/081,065, filed on Sep. 21, 2020.

(51) Int. Cl.
*B05B 15/652* (2018.01)
*B05B 9/01* (2006.01)
*B05B 1/04* (2006.01)

(52) U.S. Cl.
CPC .............. *B05B 15/652* (2018.02); *B05B 1/04* (2013.01); *B05B 9/01* (2013.01)

(58) Field of Classification Search
CPC ......... B05B 15/65; B05B 15/652; B05B 9/01; B05B 1/04; B05B 7/0815; Y10S 239/11
USPC ....... 239/119, 525, 526, 309, 391, 392, 394, 239/461, 504, 505, DIG. 11
See application file for complete search history.

(56) References Cited

U.S. PATENT DOCUMENTS

| | | | | |
|---|---|---|---|---|
| 3,504,206 A * | 3/1970 | Daniel | G04B 11/04 | 310/21 |
| 3,955,763 A | 5/1976 | Pyle et al. | | |
| 4,165,836 A | 8/1979 | Eull | | |
| 4,331,296 A | 5/1982 | Levey | | |
| 4,442,392 A * | 4/1984 | Hore | B60K 37/06 | 318/696 |
| 4,715,537 A | 12/1987 | Calder | | |
| 4,757,947 A | 7/1988 | Calder | | |
| 5,280,853 A | 1/1994 | Perret, Jr. | | |
| 5,294,053 A | 3/1994 | Perret, Jr. | | |
| 5,425,506 A | 6/1995 | Carey | | |
| 5,595,451 A | 1/1997 | Harrison, Jr. | | |
| 5,660,332 A | 8/1997 | Carey et al. | | |
| 5,749,528 A | 5/1998 | Carey et al. | | |
| 5,911,364 A | 6/1999 | Johnson et al. | | |
| 6,460,787 B1 | 10/2002 | Hartle et al. | | |
| 6,702,198 B2 | 3/2004 | Tam et al. | | |
| 6,854,667 B2 | 2/2005 | Ulrich et al. | | |
| 6,860,438 B1 | 3/2005 | Huang | | |

(Continued)

*Primary Examiner* — Steven J Ganey
(74) *Attorney, Agent, or Firm* — Suiter Swantz pc llo

(57) ABSTRACT

An indexing mechanism for a fluid spray gun may include, but is not limited to: a first detent magnet including: one or more radial portions having a first polarity; one or more radial portions having a second opposite polarity; and a central aperture, a second detent magnet including: one or more radial portions having the first polarity; one or more radial portions having the second opposite polarity; and a central aperture, wherein one or more radial portions of the first detent magnet are configured to align with one or more radial portions of the second detent magnet having an opposite polarity to retain the relative rotational positions of the first detent magnet and the second detent magnet.

6 Claims, 11 Drawing Sheets

(56) References Cited

U.S. PATENT DOCUMENTS

| | | | |
|---|---|---|---|
| 7,000,855 | B1 | 2/2006 | Chen |
| 8,807,459 | B2 | 8/2014 | Andersen |
| 2002/0014541 | A1 | 2/2002 | Krohn et al. |
| 2006/0118661 | A1 | 6/2006 | Hartle et al. |
| 2008/0247808 | A1 | 10/2008 | Costigan |
| 2009/0056622 | A1 | 3/2009 | Potter |
| 2009/0145980 | A1 | 6/2009 | Jones |
| 2009/0152378 | A1 | 6/2009 | Potter |
| 2010/0072300 | A1 | 3/2010 | Miller et al. |

* cited by examiner

FLUID SPRAY GUN

PRIORITY

The present application claims priority under 35 U.S.C. § 119 to U.S. Provisional Patent Application Ser. No. 63/081,065, filed Sep. 21, 2020, entitled Airless Fluid Spray Gun, naming Matthew Andersen as an inventor, which is incorporated herein by reference in its entirety to the extent it is consistent herewith.

FIELD OF THE INVENTION

This invention relates to a fluid (e.g., paint) spray gun wherein a tip guard, having a spray tip associated therewith, may be selectively rotatably moved with respect to a spray gun frame to change an orientation of a spray pattern of the spray tip.

BRIEF DESCRIPTION OF THE DRAWINGS

The numerous advantages of the disclosure may be better understood by those skilled in the art by reference to the accompanying figures in which.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
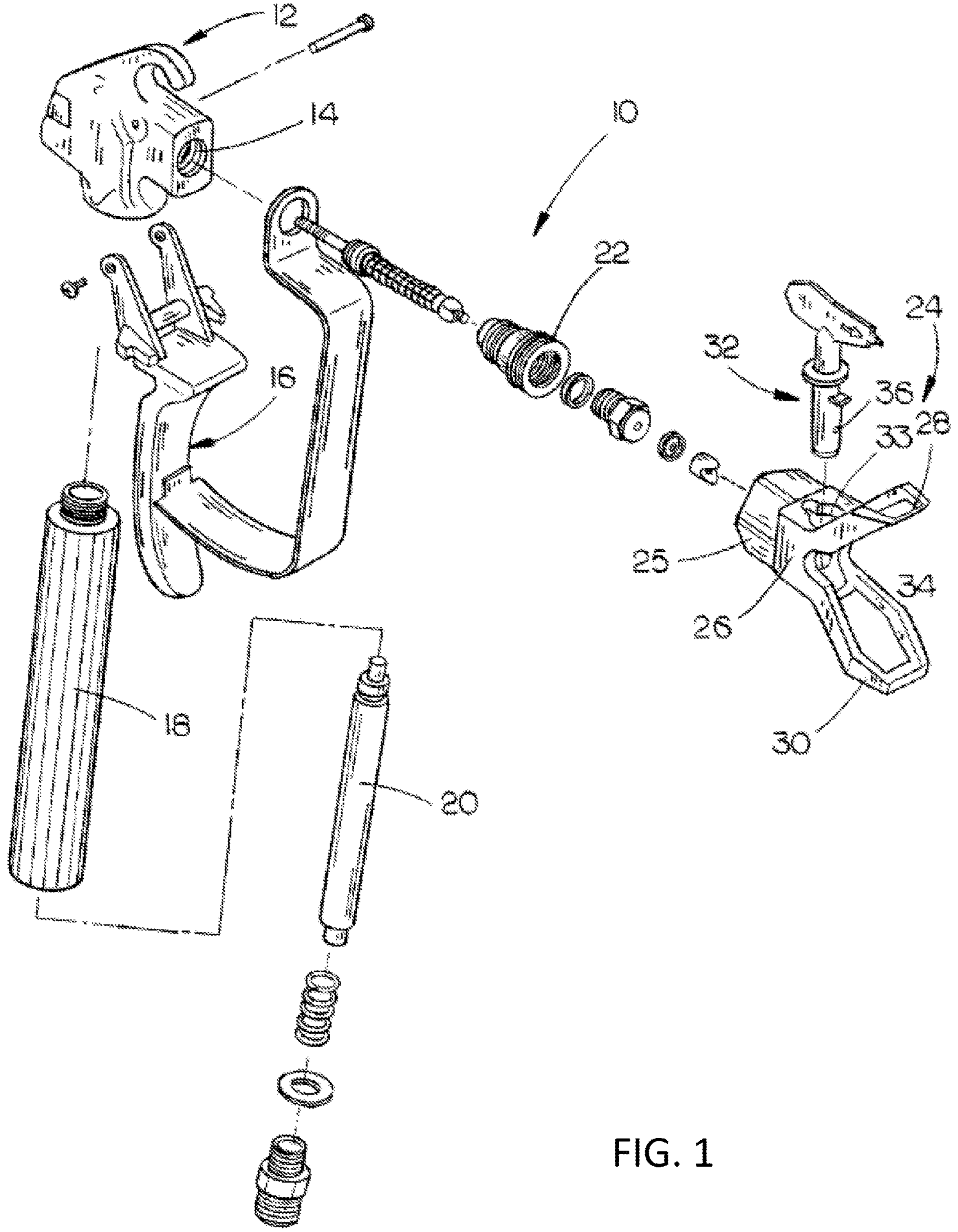
FIG. 1 is a partial perspective exploded view of a spray gun.
Figure 2:
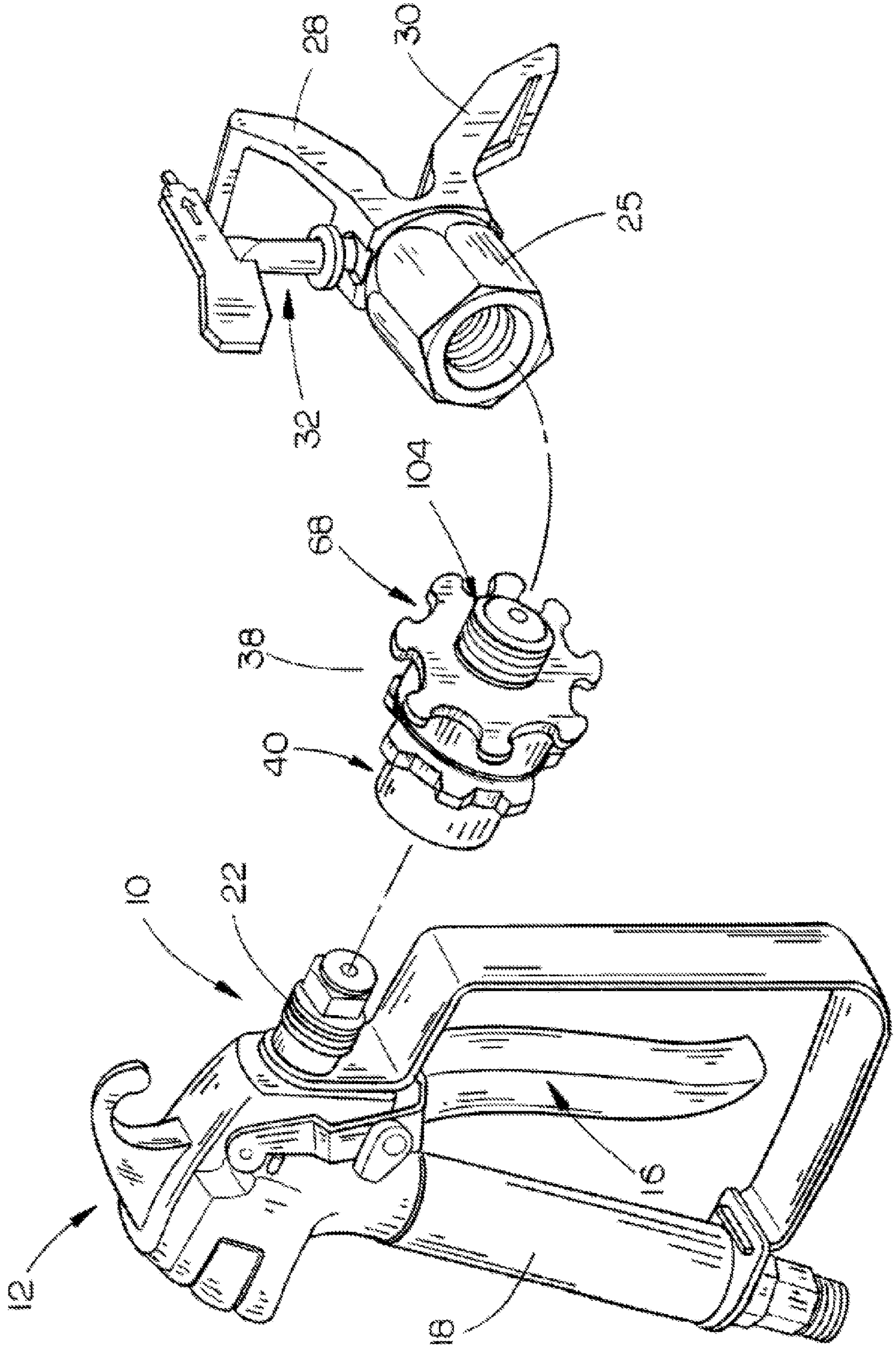
FIG. 2 is an exploded perspective view illustrating an indexing mechanism disposed between a tip guard and a frame of a spray gun.
Figure 3:
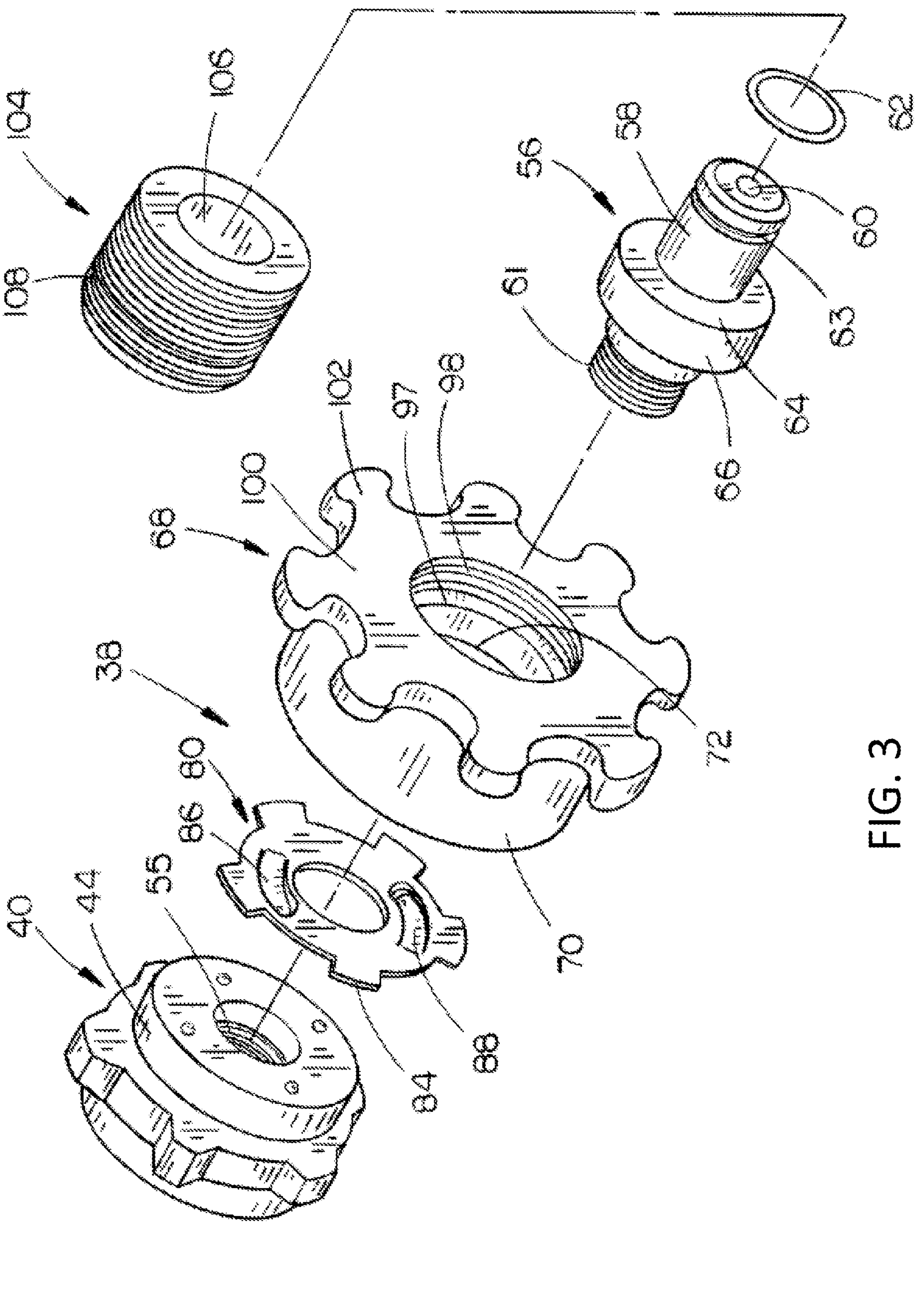
FIG. 3 is an exploded perspective view of an indexing mechanism.
Figure 4:
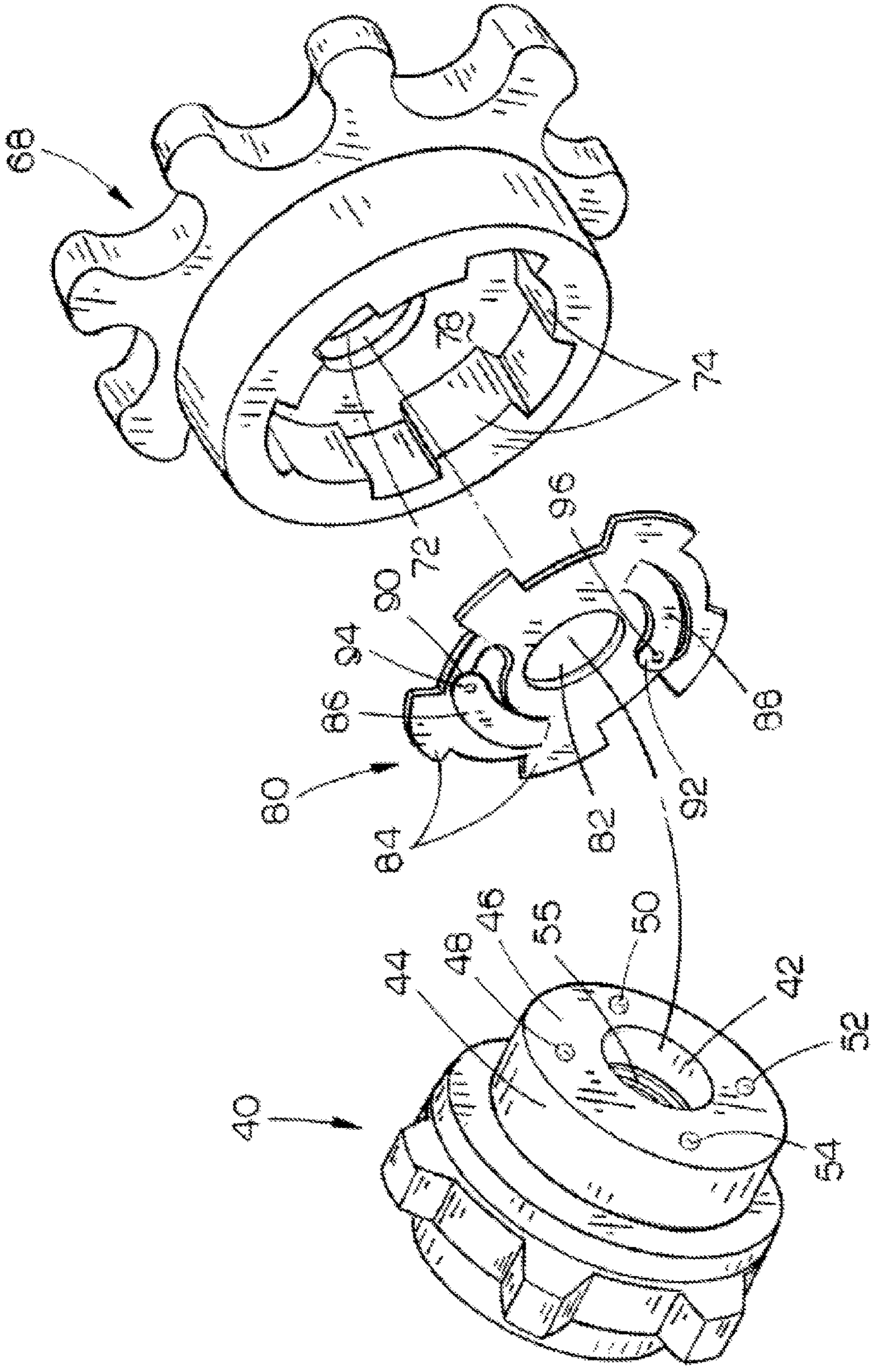
FIG. 4 is an exploded perspective view of an indexing mechanism.
Figure 5:
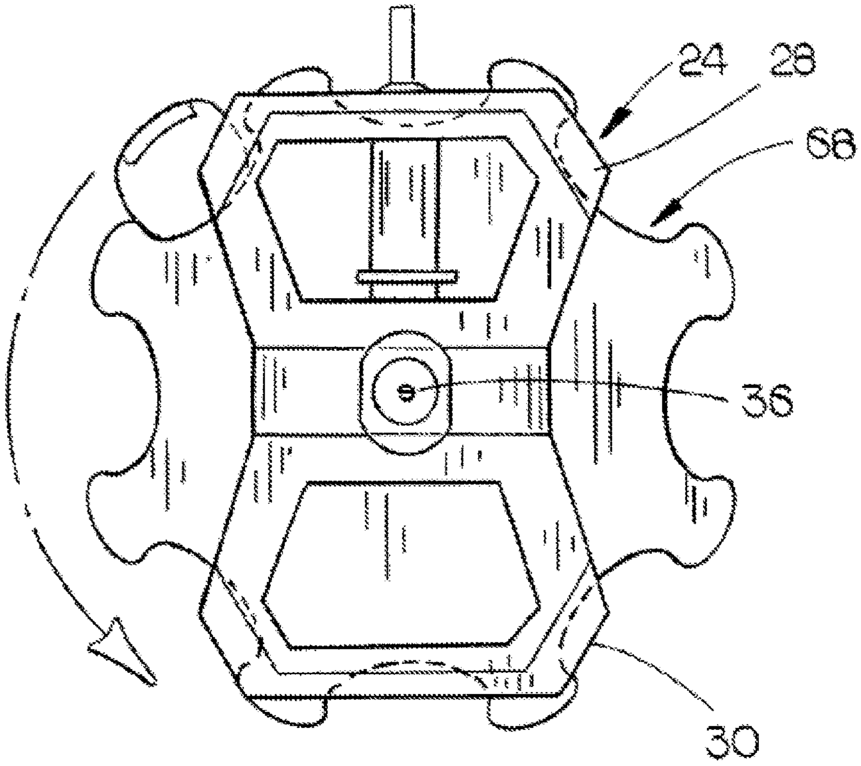
FIG. 5 is an end view of a tip guard wherein a spray tip will discharge fluid in a horizontal pattern.

In FIG. 1, an airless fluid spray gun 10 may include a gun head 12 having a threaded discharge opening 14 formed therein, a trigger assembly 16 and a handle 18 having a filter 20 therein. The lower end of handle 18 may be connected to a pressurized fluid source (not shown) by a flexible fluid hose 21. The upper discharge end of handle 18 is fluidly connected to an intake opening formed in the lower end of gun head 12. A retainer nut housing or thread base 22 is threadably secured to the threaded discharge opening 14. Further, in FIG. 1, a tip guard assembly 24 may include a retaining nut 25 which is rotatably secured to a base 26 having diverging tip guard members or ears 28 and 30 extending therefrom. A spray tip turret 32 is received in a transversely extending bore 33 formed in base 26 which communicates with a forwardly extending bore 34. The tip turret 32 may include an elongated discharge orifice 36 to spray fluid therefrom in a fan-like pattern which is horizontally disposed when the tip guard members are vertically disposed as seen in FIGS. 1 and 5.

When retaining nut 25 is tightened onto thread base 22, the base 26 and ears 28 and 30 are held in position. When it is desired to convert the spray pattern from a horizontal pattern to a vertical pattern, the retaining nut 25 must be loosened from thread base 22 so that the user may manually rotate the tip guard assembly 24 90°. Since the airless fluid spray gun 10 is being held in one hand by the user, the user may be required to take his/her other hand, loosen retaining nut 25, rotate tip guard assembly 24 ninety degrees, and retighten retaining nut 25. If the user is holding onto a ladder with his/her other hand, the user must release his/her grip on the ladder to perform the rotation task. If the user does not desire to do the above outlined task, he/she must rotate the gun 90° which may be difficult and tiresome due to the weight of the fluid hose 21 hanging from handle 18. For these reasons, Applicant has provided a device which permits the user to rotate the tip guard assembly 24 90° with the same hand which is grasping the spray gun without loosening the retaining nut 25.

An indexing mechanism 38 may be disposed between the thread base 22 and the retaining nut 25. The indexing mechanism 38 may include a mounting nut 40 having an axial bore 42 extending between a rearward end of mounting nut 40 and a forward end of the mounting nut 40. The mounting nut 40 may have an internally threaded portion 43 at the rearward end of the axial bore 42 which is threadably mounted on the forward end of thread base 22. The mounting nut 40 may have a reduced diameter portion 44 at its forward end which has a flat face 46 at the forward end thereof. The face 46 may have four indentations 48, 50, 52 and 54 formed therein which are radially spaced-apart 90° from one another. The forward end of thread base 22 may include internal threads 55.

An elongated central shaft 56 may include a tubular body portion 58 having an axial bore 60 extending therethrough. The rearward end of tubular body portion 58 may have external threads 61 which are threadably received by the internal threads 55 of thread base 22 so that central shaft 56 is fixed against mounting nut 40 to limit rotation.

The forward end of tubular body portion 58 preferably has an O-ring 62 mounted in an annular groove or channel 63 formed therein. The central shaft 56 has a transversely extending, ring-shaped shoulder 64 intermediate the ends thereof which provides a bearing surface 66 on the periphery thereof.

The indexing mechanism 38 may also include a central body 68 having a hub portion 70 with rearward and forward ends. An axial bore 72 extends through hub portion 70. The inner rearward end of hub portion 70 is provided with a plurality of radially spaced-apart splines 74 which extend forwardly to a wall 78.

The indexing mechanism 38 may also include a disc-like detent spring 80 having a rearward face and a forward face. The detent spring 80 may have a central bore 82 which receives the inner end of tubular body portion 58 so that detent spring 80 is rotatably mounted thereon adjacent the face 46 of mounting nut 40. The detent spring 80 may have a plurality of splines 84 which are received between the splines 74 of hub portion 70 so that the rotation of central body 68 with respect to central shaft 56 will also cause detent spring 80 to rotate therewith. The detent spring 80 may be positioned adjacent the rearward side of wall 78 as seen. The detent spring 80 may include spring arms 86 and 88 having free ends 90 and 92 respectively which project rearwardly from the rearward side thereof.

The rearward sides of the free ends 90 and 92 of spring arms 86 and 88 have detent projections 94 and 96 extending rearwardly therefrom respectively which are adapted to be received by the indentations 48, 50, 52 and 54 as will be described in more detail hereinafter.

The inner forward end of central body 68 may have an annular bearing support surface 97 formed therein. The central body 68 may also have internal threads 98 formed therein forwardly of bearing support surface 97. An actuator ring 100 extends radially outwardly from hub portion 70 at the forward end thereof. The outer periphery of actuator ring 100 has a plurality of spaced-apart knobs 102 formed thereon.

A thread base 104 may include an internal bore 106 extending therethrough. The thread base 104 has external threads 108 formed thereon.

Figure 7:
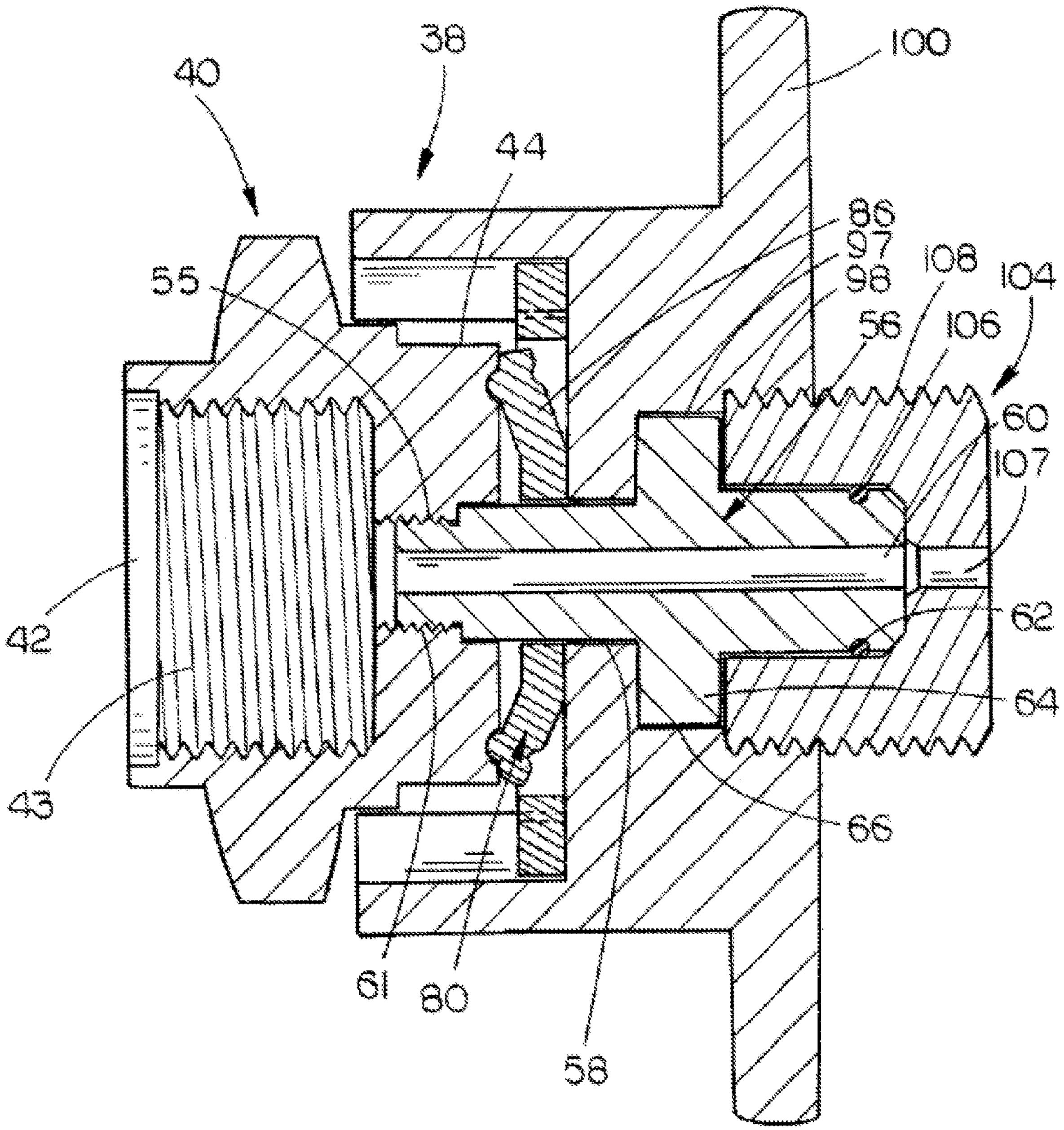
FIG. 7 is a sectional view of an indexing mechanism.
Figure 8:
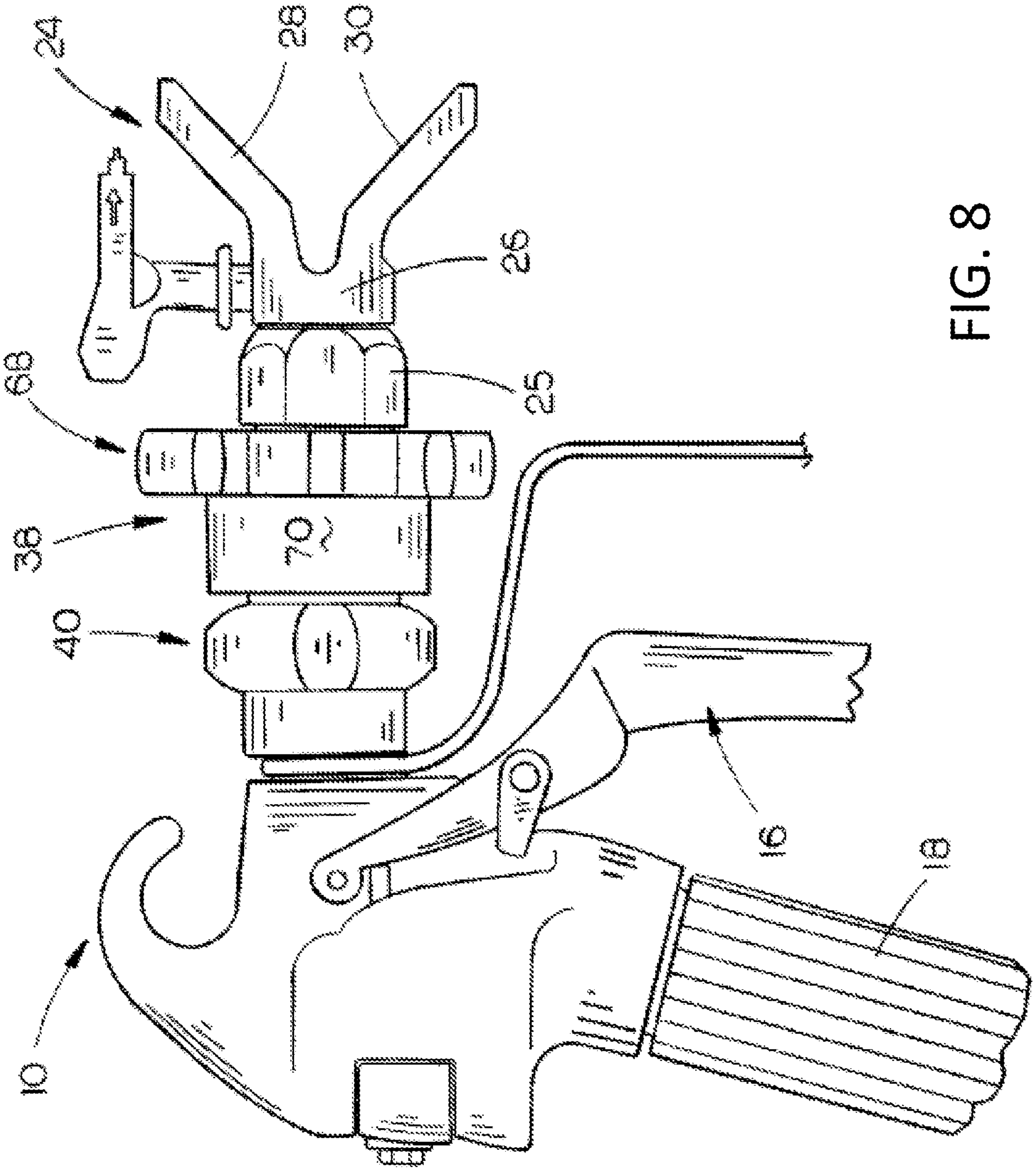
FIG. 8 is a side view illustrating an indexing mechanism disposed between a tip guard and a frame of a spray gun.

The indexing mechanism 38 may be assembled as follows. The detent spring 80 may be inserted into the rearward end of hub portion 70 of central body 68 so that the splines 84 of detent spring 80 are received between the splines 74 of hub portion 70 and so that the forward face of detent spring 80 is in engagement with wall 78 in hub portion 70. The rearward end of central shaft 56 may be inserted into the forward end of axial bore 42 until bearing surface 66 of central shaft 56 is in engagement with bearing support surface 97 of hub portion 70. The forward end of mounting nut 40 is then threaded onto the external threads 61 of central shaft 56. At that time, the free ends 90 and 92 of spring arms 86 and 88 will be in engagement with face 46 of mounting nut 40. The rearward end of thread base 104 is then threadably secured to the internal threads 98 of hub portion 70 with the forward end of tubular body portion 58 of central shaft 56 being received in thread base 104 as seen in FIG. 7. Thus, when assembled as seen in FIG. 7, the hub portion 70, actuator ring 100 and detent spring 80 may be rotated with respect to central shaft 56 which is fixed to mounting nut 40.

The tip guard assembly 24 may be disconnected from the thread base 22 by unthreading retaining nut 25 from thread base 22. The mounting nut 40 is then threaded onto the thread base 22 so that mounting nut 40 and central shaft 56 are fixed against rotation to the airless fluid spray gun 10. The actuator ring 100 and hub portion 70 are then rotated until the detent projections 94 and 96 on spring arms 86 and 88 respectively are received in a pair of opposing indentations 48, 50, 52 and 54 (e.g., indentations 48 and 52, indentations 50 and 54, indentations 52 and 48, or indentations 54 and 50. The tip guard assembly 24 may then be secured to the indexing mechanism 38 by threading the retaining nut 25 onto thread base 104, the base 26 is rotated until the ears 28 and 30 of tip guard assembly 24 are vertically aligned such as seen in FIG. 5. The retaining nut 25 may then be completely tightened onto thread base 104.

Figure 6:
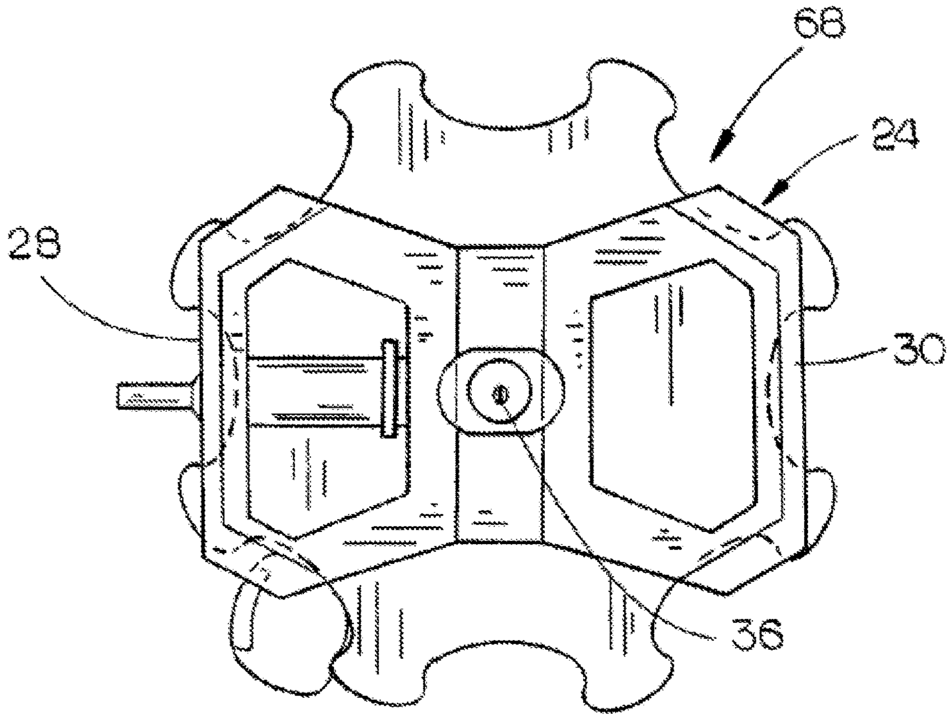
FIG. 6 is an end view of a tip guard wherein a spray tip will discharge fluid in a vertical pattern.
Figure 9:
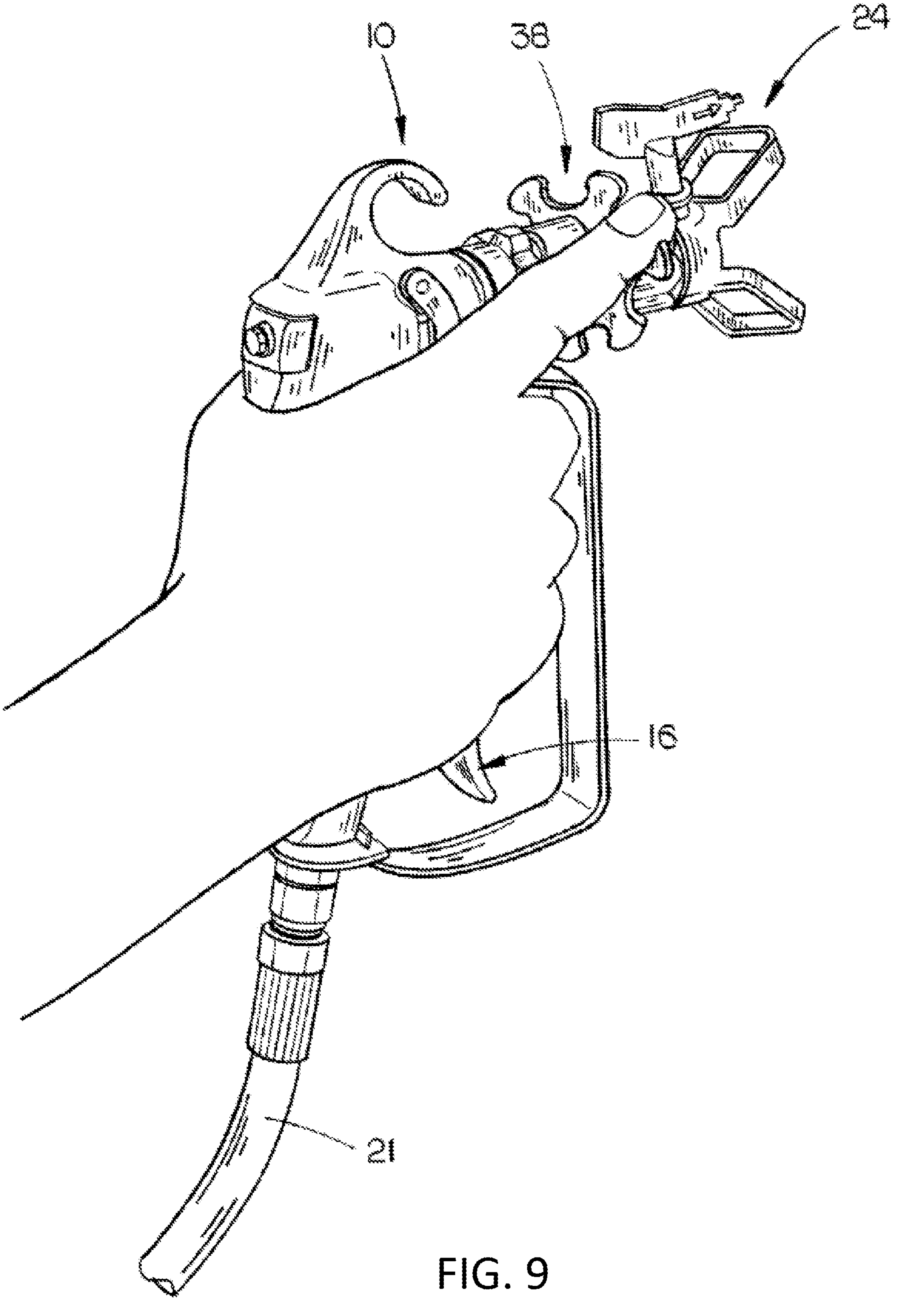
FIG. 9 is a perspective view illustrating a manner in which a user may rotate an indexing mechanism with his/her index finger to change a spray pattern from vertical to horizontal or vice versa.

In use, the vertical positioning of the ears 28 and 30, as seen in FIG. 5, will cause the fluid to be sprayed from the orifice 36 in a fan-like horizontal pattern. As seen in FIG. 9, the airless fluid spray gun 10 is held by one hand of a user. Should the user desire to change the spray pattern from horizontal to vertical, the user places his/her index finger between a pair of the knobs 102 on actuator ring 100 and rotate the actuator ring 100 in a clockwise manner, as viewed in FIG. 9, which will rotate the detent spring 80 with respect to face 46 of mounting nut 40. The user will continue to rotate actuator ring 100 until he/she feels the detent projections 94 and 96 engaging the next pair of opposing indentations 48, 50, 52 and 54 which are positioned 90° from the previous pair of opposing indentations 48, 50, 52 and 54. When the user has rotated the tip guard assembly 24 90°, the ears 28 and 30 will be positioned as seen in FIG. 6 so that the orifice 36 will discharge the fluid in a vertical pattern.

It can be seen that the indexing mechanism 38 of this invention permits the user to quickly and easily change the spray patterns without loosening the retaining nut 25 as is necessary in the prior art spray guns. The actuator ring 100 is positioned conveniently within reach of the user's index finger. It can therefore be seen that the invention accomplishes at least all of its stated objectives. Although FIG. 9 shows the spray gun being held by the right hand of the user, the user could also hold the spray gun in his/her left hand. If the spray gun is being held in the user's left hand, the user will use his/her left index finger to rotate the actuator ring 100 in a counter-clockwise direction.

Figure 10:
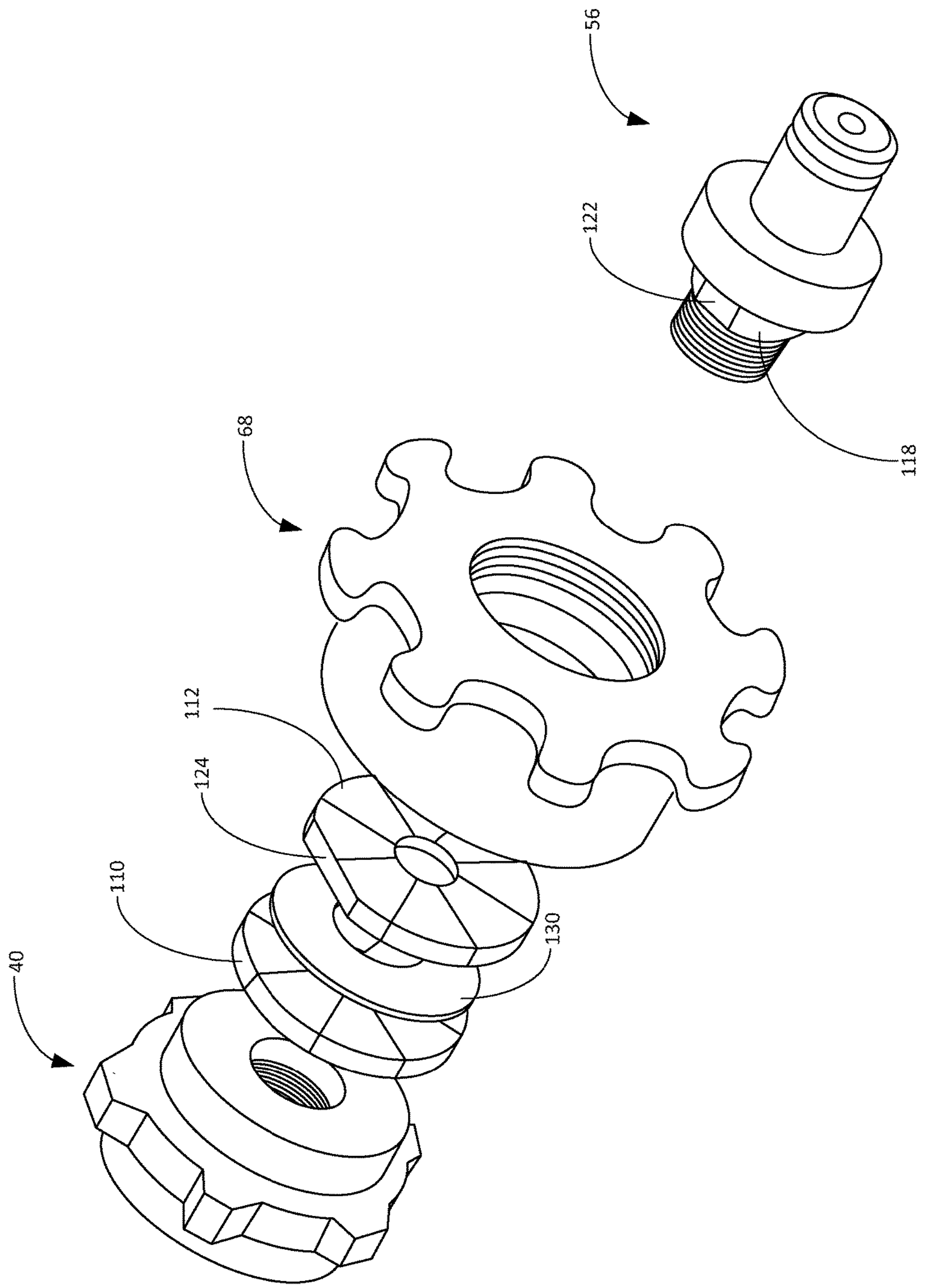
FIG. 10 is an exploded perspective view of an indexing mechanism.
Figure 11:
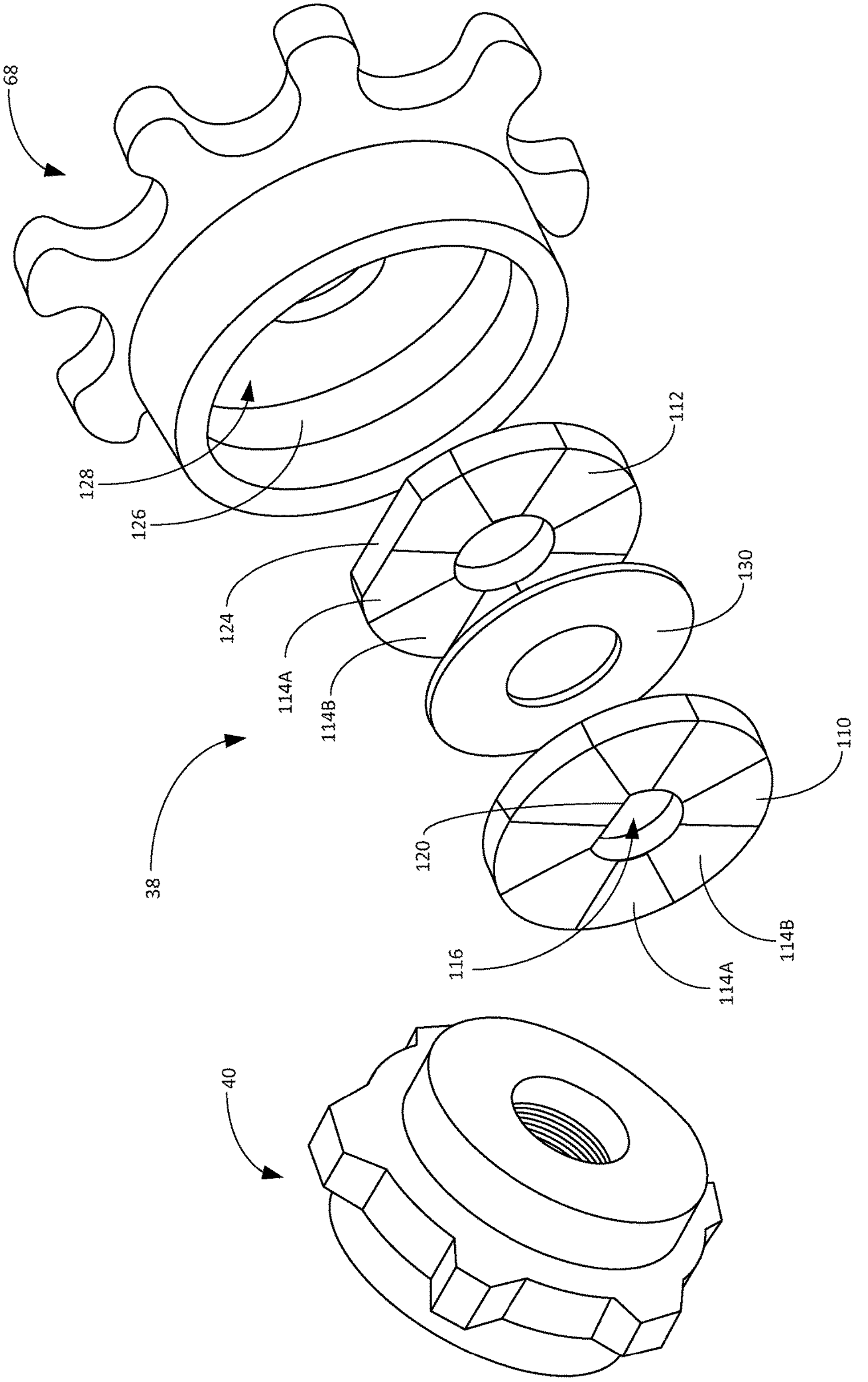
FIG. 11 is an exploded perspective view of an indexing mechanism.

In an alternate embodiment, the detent spring 80 with spring arms 86 and 88 and corresponding detent projections 94 and 96 of the indexing mechanism 38 may be replaced with one or more magnets providing detent functionality. For example, as shown in FIGS. 10 and 11, the indexing mechanism 38 may include a first detent magnet 110 and a second detent magnet 112. Each of the first detent magnet 110 and the second detent magnet 112 may be constructed such that they include radial portions 114 having opposite polarity (e.g., positive radial portions 114A and negative radial portions 114B). In such a configuration, when brought into proximity, the respective magnetic forces of the positive radial portions 114A and negative radial portions 114B will serve to co-align the first detent magnet 110 and the second detent magnet 112 at relative rotational positions. For example, in one embodiment, each of the first detent magnet 110 and the second detent magnet 112 may include eight radial portions 114, with four positive radial portions 114A and four negative radial portions 114B. In such a configuration, the first detent magnet 110 and the second detent magnet 112 may provide for four relative detent positions, at 0°, 90°, 180° and 270°. While shown in FIG. 10 with eight radial portions 114, the first detent magnet 110 and the second detent magnet 112 of indexing mechanism 38 may provide any number of relative detent positions by increasing or decreasing the number of radial portions 114 accordingly.

As shown in FIGS. 10 and 11, the first detent magnet 110 may include an aperture 116 through which a flange portion 118 of the central shaft 56 may be received as the central shaft 56 is threadably coupled to the mounting nut 40. The aperture 116 of the first detent magnet 110 may include a flat portion 120 which may index to a corresponding flat perimeter surface 122 of the flange portion 118 of the central shaft 56. Upon insertion of the central shaft 56 into the aperture 116 and coupling of the central shaft 56 to the mounting nut 40, the flat portion 120 of the aperture 116 and the flat perimeter surface 122 of the flange portion 118 may contact so as to restrict the rotation of the first detent magnet 110 relative to the airless fluid spray gun 10.

Figure 12:
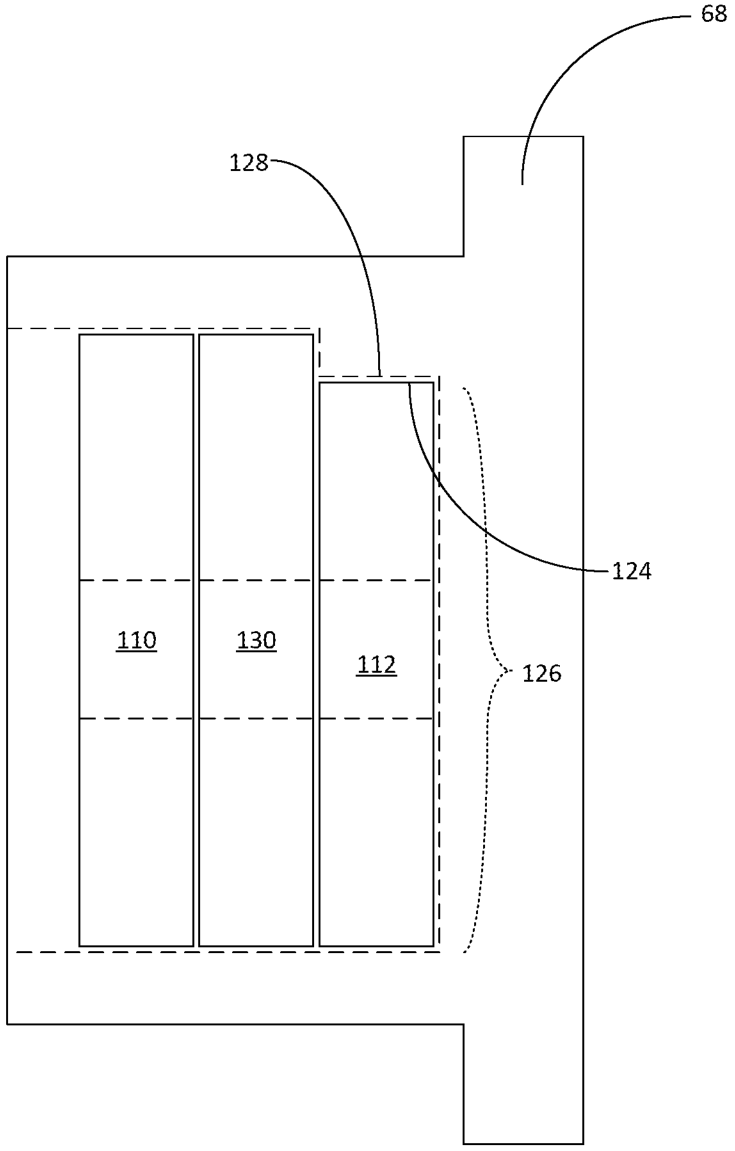
FIG. 12 is a cross-sectional view of indexing magnets disposed within a recess of a central body.

As shown in FIGS. 10-12, the second detent magnet 112 may include a perimeter surface including a flat portion 124. The central body 68 may define a recess 126 corresponding to the perimeter shape (including a flat portion 128 corresponding to the flat portion 124 of the second detent magnet 112) and depth of the second detent magnet 112 such that the second detent magnet 112 may be disposed within the recess 126. Upon insertion of the second detent magnet 112 into the recess 126, the flat portion 124 of the second detent magnet 112 and the flat portion 128 of the recess 126 of the central body 68 may contact such that rotation of the central body 68 responsive to a torque applied via the central body 68 by a user (as described above) results in a corresponding rotation of the second detent magnet 112.

As shown in FIGS. 10-12, the indexing mechanism 38 may further include at least one spacer 130. The spacer 130 may be of a non-metallic and/or non-magnetic composition (e.g. plastic) to allow the first detent magnet 110 and the second detent magnet 112 to rotate relative to one another when a torque is applied via the central body 68 by a user (as described above). The thickness of the spacer 130 may be varied according to a desired degree of magnetic interaction between the first detent magnet 110 and the second detent magnet 112. For example, if a reduced amount of torque is desired to rotate of the central body 68 a thicker spacer 130 may be utilized. Alternately, if greater holding strength a given detent position (and corresponding higher amount of torque required to rotate of the central body 68) is desired, a thinner spacer 130 may be utilized.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed:

1. An indexing mechanism for a fluid spray gun comprising:

a first detent magnet including:
  one or more radial portions having a first polarity;
  one or more radial portions having a second opposite polarity; and
  a central aperture,
a second detent magnet including:
  one or more radial portions having the first polarity;
  one or more radial portions having the second opposite polarity;
  a central aperture, and
a central shaft including an axial bore providing a fluid conduit, the central shaft being configured to be received through the central aperture of the first detent magnet and the central aperture of the second detent magnet;
wherein one or more radial portions of the first detent magnet are configured to align with one or more radial portions of the second detent magnet having an opposite polarity to retain the relative rotational positions of the first detent magnet and the second detent magnet.

2. The indexing mechanism for a fluid spray gun of claim 1, further comprising:

a central body including an axial bore configured to receive the central shaft.

3. The indexing mechanism for a fluid spray gun of claim 2, wherein the second detent magnet includes a perimeter shape including a flat portion, and
wherein the central body defines a recess corresponding to the perimeter shape and depth of the second detent magnet.

4. The indexing mechanism for a fluid spray gun of claim 2, further comprising:

a mounting nut configured to threadably couple with the central shaft following reception of the central shaft through the central body, the central aperture of the first detent magnet, and the central aperture of the second detent magnet.

5. The indexing mechanism for a fluid spray gun of claim 1, wherein the central shaft includes a flange portion having a flat perimeter surface,
wherein the central aperture of the first detent magnet includes a flat portion, and
wherein the central aperture of the first detent magnet is configured to receive the central shaft such that the flat portion of the central aperture of the first detent magnet contacts the flat perimeter surface of the flange portion of the central shaft.

6. An indexing mechanism for a fluid spray gun of comprising:

a first detent magnet including:
  one or more radial portions having a first polarity;
  one or more radial portions having a second opposite polarity; and
  a central aperture,
a second detent magnet including:
  one or more radial portions having the first polarity;
  one or more radial portions having the second opposite polarity; and
  a central aperture, and
at least one spacer disposed between the first detent magnet and the second detent magnet,
wherein one or more radial portions of the first detent magnet are configured to align with one or more radial portions of the second detent magnet having an opposite polarity to retain the relative rotational positions of the first detent magnet and the second detent magnet.

* * * * *